United States Patent [19]

Moini

[11] Patent Number: 5,162,283

[45] Date of Patent: Nov. 10, 1992

[54] HIGHLY POROUS AMORPHOUS TITANIA AND TITANIA/SILICA PHASES

[75] Inventor: Ahmad Moini, Lawrenceville, N.J.

[73] Assignee: Mobil Oil Corporation, Fairfax, Va.

[21] Appl. No.: 644,151

[22] Filed: Jan. 22, 1991

[51] Int. Cl.$^5$ .............................................. B01J 21/06
[52] U.S. Cl. ................................... 502/236; 502/242; 502/350
[58] Field of Search ............... 502/236, 239, 350, 242; 423/610

[56] References Cited

U.S. PATENT DOCUMENTS

| | | | |
|---|---|---|---|
| 2,824,137 | 2/1958 | Morris | 502/350 |
| 4,176,089 | 11/1979 | Cull | 502/236 |
| 4,547,557 | 10/1985 | McDaniel | 502/236 |

OTHER PUBLICATIONS

"Structural Investigation of the Hydrolysis–Condensation Process of Titanium Alkoxides Ti(OR)$_4$(OR=O-Pr$^i$, OEt) Modified by Acetylacetone. 2. From the Modified Precursor to the Colloids", *Chemistry of Materials*, 1989, vol. 1, No. 2, Anne Leaustic, Florence Babonneau and Jacques Livage, pp. 248–252.

*Science of Ceramic Chemical Processing*, "Use of Mixed Titanium Alkoxides For Sol-Gel Processing", 1986, John Wiley & Sons, Inc., William C. LaCourse and Sunuk Kim, pp. 304–310 (Chapter 10).

"Aerogels and Related Porous Materials", *Chemical Reviews*, 1989, vol. 89, No. 4, H. D. Gesser and P. C. Goswami, pp. 765–788.

"Structural Investigation of the Hydrolysis–Condensation Process of Titanium Alkoxides Ti(OR)$_4$ (OR=O-Pr$^i$,OEt) Modified by Acetylacetone. 1. Study of the Alkoxide Modification", *Chemistry of Materials*, 1989, vol. 1, No. 2, Anne Leaustic, Florence Babonneau and Jacques Livage, pp. 240–247.

*Primary Examiner*—Carl F. Dees
*Attorney, Agent, or Firm*—Alexander J. McKillop; Charles J. Speciale; Edward F. Kenehan, Jr.

[57] ABSTRACT

There is provided a highly porous amorphous titania or titania/silica material. The material may be prepared by gelling a reaction mixture comprising hydrolyzable titanium and optionally, hydrolyzable silicon compounds, such as titanium diisopropoxide (2,4-pentanedionate) and tetraethylorthosilicate, a nonaqueous solvent, such as ethanol, and water, followed by drying the gel. The titania or titania/silica material may be used as a catalyst, a catalyst support or a sorbent.

7 Claims, No Drawings

HIGHLY POROUS AMORPHOUS TITANIA AND TITANIA/SILICA PHASES

BACKGROUND

There are provided highly porous amorphous titania and titania/silica materials. There are also provided methods for preparing these materials. There are further provided processes for using these materials, e.g., as catalyst, catalyst supports and sorbents.

Amorphous metal oxides and mixed oxides, such as $TiO_2/SiO_2$, are of interest because of their acid catalytic properties and strong interactions with supported metals. Most of the materials of this type, however, suffer from low surface areas which rule out most applications. These types of materials are formed either by deposition of a secondary oxide onto the surface of another oxide or by co-precipitation of two precursors. The former technique presents problems with the degree of homogeneity of the resulting phase. The latter method is a more effective means of preparing these materials, but usually involves high temperature calcinations for the removal of the organic species, thus leading to sintering and loss of surface area.

SUMMARY

According to an aspect of this disclosure, there is provided an amorphous titania or titania/silica material having a BET surface area of at least 120 $m^2/g$.

According to another aspect of this disclosure, there is provided a catalyst comprising a binder and an amorphous titania or titania/silica material having a BET surface area of at least 120 $m^2/g$.

According to another aspect of this disclosure, there is provided a catalyst comprising a hydrogenation metal and an amorphous titania or titania/silica material having a BET surface area of at least 120 $m^2/g$.

According to another aspect of this disclosure, there is provided a method for preparing an amorphous titania/silica material, said method comprising the steps of:
(i) preparing a reaction mixture comprising (a) a hydrolyzable titanium compound, (b) a hydrolyzable silicon compound, (c) a nonaqueous solvent for said hydrolyzable titanium compound and said hydrolyzable silicon compound and (d) water;
(ii) subjecting said reaction mixture to sufficient hydrothermal hydrolyzing conditions to promote gelation of said reaction mixture;
(iii) drying the gel of step (ii); and
(iv) recovering an amorphous titania/silica material having a BET surface area of at least 120 $m^2/g$.

According to another aspect of this disclosure, there is provided a method for preparing an amorphous titania material, said method comprising the steps of:
(i) preparing a reaction mixture comprising (a) a hydrolyzable titanium compound, (b) a nonaqueous solvent for said hydrolyzable titanium compound and said hydrolyzable silicon compound and (c) water;
(ii) subjecting said reaction mixture to sufficient hydrothermal hydrolyzing conditions to promote gelation of said reaction mixture;
(iii) drying the gel of step (ii); and
(iv) recovering an amorphous titania material having a BET surface area of at least 120 $m^2/g$.

According to another aspect of this disclosure, there is provided a process for converting an organic compound, said process comprising contacting said organic compound with a catalyst under sufficient conversion conditions, said catalyst comprising an amorphous titania/silica material having a BET surface area of at least 120 $m^2/g$. According to another aspect of this disclosure, there is provided a process for converting an organic compound, said process comprising contacting said organic compound with a catalyst under sufficient conversion conditions, said catalyst comprising an amorphous titania material having a BET surface area of at least 120 $m^2/g$.

EMBODIMENTS

The hydrolyzing conditions for preparing the amorphous titania or titania/silica are hydrothermal conditions. These conditions may include a temperature of at least 80° C., and hydrolyzation may take place under reflux conditions. This hydrolyzation may take place slowly, e.g., over a period of at least 12 hours. Nonaqueous solvent may be evaporated from the reaction mixture during the hydrolyzation. This hydrolyzation may also take place in a closed bomb reactor at temperatures greater than 100° C., e.g., 150° C. or greater.

The amorphous titania materials and the amorphous titania/silica materials may contain small amounts, e.g., less that 10 wt %, of intentionally added additional solid oxides, such as alumina, or these materials may be essentially free of such additional oxides. By the term, essentially free, it will be understood that the titania or titania/silica may be free of intentionally added solid oxides other than titania or silica, but that these materials may contain unintentionally added trace amounts of such additional oxides, such as those amounts normally found as detectable impurities in sources of titania and silica.

The amorphous titania/silica materials may contain a mole ratio of titania to silica of from about 9 to 100.

The titania and titania/silica materials described herein can optionally be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or intimately physically admixed therewith. Such component can be impregnated in, or on, the titania or titania/silica material such as, for example, by, in the case of platinum, treating the material with a solution containing a platinum metal-containing ion. Thus, suitable platinum compounds for this purpose include chloroplatinic acid, platinous chloride and various compounds containing the platinum amine complex.

The titania or titania/silica may be subjected to thermal treatment, e.g., to dry the material. This thermal treatment is generally performed by heating at a temperature of at least about 370° C. for at least 1 minute and generally not longer than 20 hours. While subatmospheric pressure can be employed for the thermal treatment, atmospheric pressure is preferred simply for reasons of convenience.

The titania and titania/silica materials described herein are useful as catalysts, catalyst supports and sorbents.

Prior to its use in catalytic processes described herein, the titania or titania/silica material catalyst is preferably dehydrated, at least partially. This dehydration can be done by heating the material to a temperature in the range of from about 200° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the material in a vacuum, but a longer time is required to obtain a sufficient amount of dehydration.

The titania or titania/silica material catalyst can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the material can be extruded before drying or partially dried and then extruded.

It may be desired to incorporate the titania or titania/silica material with another material which is resistant to the temperatures and other conditions employed in the catalytic processes described herein. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with titania or titania/silica, i.e., combined therewith or present during its synthesis, which itself is catalytically active may change the conversion and/or selectivity of the catalyst. Inactive materials suitably serve as diluents to control the amount of conversion so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use, it is desirable to prevent the catalyst from breaking down into powder-like materials. These clay binders have been employed normally only for the purpose of improving the crush strength of the catalyst.

Naturally occurring clays which can be composited with titania or titania/silica materials include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with titania or titania/silica materials also include inorganic oxides, notably alumina.

In addition to the foregoing materials, the titania or titania/silica materials can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of finely divided titania/silica materials and inorganic oxide matrix vary widely, with the material content ranging from about 1 to about 90 percent by weight and more usually, particularly when the composite is prepared in the form of beads, in the range of about 2 to about 80 weight percent of the composite.

The titania or titania/silica material described herein is useful as a catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 300° C. to about 550° C., more preferably from about 370° C. to about 500° C., a pressure of from about 0.1 psi to about 2000 psi, more preferably from about 0.1 psi to about 500 psi and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

EXAMPLE 1

To a solution containing 1200 g of 2-propanol were added 346 g of titanium diisopropoxide (2,4-pentanedionate) (75% in 2-propanol) and 9 g tetraethylorthosilicate. This solution was further diluted by the addition of 1400 g ethanol. To the resulting solution was added 270 g $H_2O$ in a dropwise fashion. Throughout this process, the solution remained transparent and homogeneous, and no precipitation was observed. This titania/silica sol was allowed to stir while exposed to the ambient atmosphere. After the volume had dropped to less than half of the original, 15 ml of the sol (ca. 4% $TiO_2$) was mixed with 5 ml of $H_2O$ and placed in a small (45 ml capacity) Teflon-lined Parr bomb. The bomb was placed in an oven at 150° C. for 20 hr. Upon completion of the reaction, the product was filtered and washed with large amounts of distilled deionized $H_2O$. The final solid was air-dried. The BET surface area of this product (outgassed at ca. 225° C.) was 199 $m^2/g$.

EXAMPLE 2

A titania/silica sol was prepared in the same manner described in Example 1. The same treatment of the sol in a bomb at 150° C. was carried out. The final washed product was then heated to 400° C. and held at that temperature for 4 hr. The BET surface area of this heated product (outgassed at ca. 225° C.) was 199 $m^2/g$, which is identical to the value obtained for the original product described in Example 1.

EXAMPLE 3

A portion (150 ml, ca. 4% $TiO_2$) of the titania/silica sol described in Example 2 was placed in a round-bottom flask and heated to reflux temperature (ca. 80° C.). A cloudy solution was formed, and after several hours, a solid phase was present. The reaction was stopped after 21 hr. Once cooled, the product was filtered and washed with distilled deionized $H_2O$. The BET surface area of this product (outgassed at ca. 225° C.) was 276 $m^2/g$. The BET surface for the same product heated to 538° C. was 120 $m^2/g$.

EXAMPLE 4

A portion (15 ml, ca. 4% $TiO_2$) of the titania/silica sol described in Example 2 was mixed with 5 ml of 0.5 N HCl and placed in a small (45 ml capacity) Teflon-lined Parr bomb. The bomb was placed in an oven at 150° C. for 20 h. Upon completion of the reaction, the product was filtered and washed with large amounts of distilled deionized $H_2O$. The final solid was air-dried. The BET surface area of this product (outgassed at ca. 225° C.) was 238 $m^2/g$.

COMPARATIVE EXAMPLE

A portion of the titania/silica sol described in Example 1 was allowed to gel at ambient temperature and pressure. This gel was gradually heated to 400° C. and held at that temperature for 4 hr. The BET surface area of the heated product (outgassed at ca. 225° C.) was 18 $m^2/g$.

EXAMPLE 5

To a solution containing 600 g of 2-propanol was added 70 g of titanium diisopropoxide (2,4-pentanedionate) (75% in 2-propanol). This solution was further diluted by the addition of 700 g ethanol. To the resulting solution was added 135 g $H_2O$ in a dropwise fashion. Throughout this process, the solution remained transparent and homogeneous, and no precipitation was observed. This titania sol was allowed to stir while exposed to the ambient atmosphere. After the volume had dropped to less than half of the original, 15 ml of the sol (ca. 4% $TiO_2$) was mixed with 5 ml of $H_2O$ and placed in a small (45 ml capacity) Teflon-lined Parr bomb. A second bomb with the exact same composition was set up. Both bombs were placed in an oven at 150° C. for 20 hr. Upon the completion of the reaction, the products were combined, filtered and washed with large amounts of distilled dionized $H_2O$. The final solid was air-dried. The BET surface area of this product (outgassed at ca. 225° C.) was 201 $m^2/g$.

What is claimed is:

1. A method for preparing an amorphous titania/silica material, said method comprising the steps of:
   (i) preparing a reaction mixture comprising (a) titanium diisopropoxide (2,4-pentanedionate) (b) a hydrolyzable silicon compound (c) a nonaqueous solvent for said titanium diisopropoxide (2,4-pentanedionate) and said hydrolyzable silicon compound and (d) water;
   (ii) subjecting said reaction mixture to sufficient hydrothermal hydrolyzing conditions to promote gelation of said reaction mixture;
   (iii) drying the gel of step (ii); and
   (iv) recovering an amorphous titania/silica material having a BET surface area of at least 120 $m^2/g$.

2. A method according to claim 1, wherein said titanium diisopropoxide (2,4-pentanedionate) and said hydrolyzable silicon compound are slowly and continuously hydrolyzed over a period of at least 12 hours.

3. A method according to claim 1, wherein said hydrolyzing conditions of step (ii) include maintaining said reaction mixture at a temperature of at least 80° C.

4. A method according to claim 1, wherein said hydrolyzing conditions of step (ii) include maintaining said reaction mixture under refluxing conditions.

5. A method according to claim 1, wherein nonaqueous solvent is evaporated from the reaction mixture during step (ii).

6. A method according to claim 1, wherein said hydrolyzable silicon compound is tetraethylorthosilicate, and said nonaqueous solvent is ethanol.

7. A method for preparing an amorphous titania material, said method comprising the steps of:
   (i) preparing a reaction mixture comprising (a) titanium diisopropoxide (2,4-pentanedionate), (b) a nonaqueous solvent for said titanium diisopropoxide (2,4-pentanedionate) and (c) water;
   (ii) subjecting said reaction mixture to sufficient hydrothermal hydrolyzing conditions to promote gelation of said reaction mixture;
   (iii) drying the gel of step (ii); and
   (iv) recovering an amorphous titania material having a BET surface area of at least 120 $m^2/g$.

* * * * *